(12) United States Patent
Dunker et al.

(10) Patent No.: US 7,648,105 B2
(45) Date of Patent: Jan. 19, 2010

(54) DEPLOYMENT BRAKE RELEASE FOR A PARACHUTE

(75) Inventors: Storm Dunker, Philadelphia, PA (US); Martin Gilbert, Maple Shade, NJ (US)

(73) Assignee: Airborne Systems North America of NJ Inc., Pennsauken, NJ (US)

( * ) Notice: Subject to any disclaimer, the term of this patent is extended or adjusted under 35 U.S.C. 154(b) by 222 days.

(21) Appl. No.: 11/645,029

(22) Filed: Dec. 26, 2006

(65) Prior Publication Data

US 2008/0149775 A1    Jun. 26, 2008

(51) Int. Cl.
*B64D 17/38* (2006.01)
*B64D 17/00* (2006.01)

(52) U.S. Cl. .................. 244/152; 244/150; 244/142
(58) Field of Classification Search .......... 244/142, 244/147, 149, 150, 152; 294/82.25
See application file for complete search history.

(56) References Cited

U.S. PATENT DOCUMENTS

| | | | | |
|---|---|---|---|---|
| 1,709,264 A * | 4/1929 | Holt | .................. | 244/138 R |
| 2,383,485 A * | 8/1945 | Irby | .................. | 294/82.32 |
| 2,502,470 A * | 4/1950 | Martin | .................. | 244/122 AE |
| 2,545,248 A * | 3/1951 | Winzen et al. | .................. | 244/138 R |
| 3,433,441 A * | 3/1969 | Cummings | .................. | 244/138 R |
| 3,437,295 A * | 4/1969 | Istel et al. | .................. | 244/148 |
| 3,773,284 A * | 11/1973 | Matsuo et al. | .................. | 244/142 |
| 3,796,398 A * | 3/1974 | Eilertson | .................. | 244/139 |
| 3,817,179 A * | 6/1974 | Ludtke et al. | .................. | 102/387 |
| 3,866,862 A * | 2/1975 | Snyder | .................. | 244/152 |
| 4,290,637 A * | 9/1981 | Fischer et al. | .................. | 294/82.25 |
| 6,220,547 B1 * | 4/2001 | Smith et al. | .................. | 244/147 |
| 6,338,457 B1 * | 1/2002 | Hilliard et al. | .................. | 244/139 |
| 6,505,793 B2 * | 1/2003 | Schwarzler | .................. | 244/142 |
| 6,622,968 B1 * | 9/2003 | St. Clair et al. | .................. | 244/138 R |
| 6,808,144 B1 * | 10/2004 | Nicolai et al. | .................. | 244/139 |
| 6,889,942 B2 * | 5/2005 | Preston | .................. | 244/152 |
| 7,059,570 B2 * | 6/2006 | Strong | .................. | 244/147 |
| 7,118,073 B2 * | 10/2006 | Booth | .................. | 244/149 |

* cited by examiner

*Primary Examiner*—Michael R Mansen
*Assistant Examiner*—Brian M O'Hara
(74) *Attorney, Agent, or Firm*—Jacobson Holman PLLC

(57) ABSTRACT

A deployment brake release system for use with an airborne guidance unit (AGU) of a parachute suitable for precision cargo delivery. The parachute includes deployment brake lines secured at one end to the edge of the canopy and connected at the other end through looped ends to motor control lines. The motor control lines are, in turn, engaged with the motor of the AGU. The deployment brake release system includes at least one hook mount having a hook secured to the AGU frame. The looped ends of the deployment brake lines are engaged with the hook during rigging so that, upon deployment, opening forces are applied to the hook mount rather than the motor. After full canopy inflation, the motor, via the motor control lines, pulls on the brake line looped ends to disengage them from the hook, transferring subsequent canopy loads to the AGU motor for the remainder of the flight. A method for releasing the deployment brake lines is also disclosed.

26 Claims, 12 Drawing Sheets

DEPLOYMENT BRAKE RELEASE FOR A PARACHUTE

BACKGROUND OF THE INVENTION

1. Field of the Invention

The present invention relates in general to deployment brakes operative during the opening of parachute canopies and, more particularly, to a deployment brake release system that is configurable for use with canopies of different types and sizes.

2. Description of the Related Art

Precision cargo delivery relies upon unmanned aerial vehicles (UAVs) to guide cargo parachutes to preselected GPS coordinates. The UAV includes an airborne guidance unit (AGU) having a structural frame that contains at least one battery, a motor, an avionics computer with GPS receiver, a motor controller, a processor, etc. A compass or other rate sensing instrument may also be included.

The precision cargo delivery parachute systems are similar to those used in personnel parachutes and can include low gliding round parachutes and higher gliding ram-air parachutes, as well as cruciform parachutes of the type disclosed in U.S. Pat. No. 6,443,396. Often the parachute systems have many operational procedures that are normally carried out by personnel and therefore must be automated in the cargo setting. One such operational procedure is the release of the deployment brakes after full inflation.

During parachute deployment, at least part of the trailing edge of the canopy is deflected. Such deflection is effected by the same mechanism used to steer the canopy once it is in flight. For example, to turn the parachute to the left while in flight, one or more steering suspension lines connected to the trailing edge on the left side of the canopy are shortened, i.e., pulled downwardly, by the motor in the AGU. This shortening deflects the corresponding trailing edge and causes the parachute to turn left. In the case of initial deployment, suspension lines attached along nearly all of the trailing edge act as brake lines and are held in a shortened configuration. The resulting trailing edge deflection prevents the canopy from rocking back and forth and provides greater canopy stability during inflation.

Peak load on the brake/suspension lines occurs during initial inflation when opening forces and the rate of deceleration are the greatest. To withstand the peak load, the motor attached to the brake/suspension lines must be relatively heavy duty which increases cost and weight, both of which are undesirable characteristics in parachute product design.

To overcome this difficulty, prior art approaches have secured the brake/suspension lines to the frame of the AGU with connection lines having associated pyrotechnic cutting devices. Once the canopy has fully inflated to the extent possible in this deployment configuration, the pyrotechnic cutters are activated to sever the connection lines and thereby release the trailing edge. While this can be effective, pyrotechnic devices require proper timing and add unwanted complexity and expense, particularly in the context of routine and repeated airborne delivery of equipment and supplies such as is needed for troop support during military operations.

Accordingly, a need exists for a deployment brake release system that is simpler and less expensive than the prior art approaches, while offering highly reliable and reusable operation.

SUMMARY OF THE INVENTION

In view of the foregoing, the present invention is directed to a deployment brake release system for use with an airborne guidance unit (AGU) of a parachute suitable for precision cargo delivery. While primarily directed to high-gliding ram-air parachutes, the present invention is applicable to any parachute having a requirement for steering line stowage or deflection upon opening including low gliding round parachutes and cruciform parachutes.

The cargo-delivery parachute according to the present invention includes deployment brake lines secured at one end to the trailing edge of the canopy and connected adjacent the other end to motor control lines, preferably through looped ends. The motor control lines are, in turn, engaged with the motor of the AGU. The deployment brake release system includes at least one hook mounted to the AGU frame. The looped ends of the deployment brake lines are engaged with the hook during rigging so that, upon deployment, opening forces are applied to the hook mount rather than to the motor. After full canopy inflation, the motor, via the motor control lines, pulls on the looped ends of the brake lines to disengage them from the hook mount. The brake lines can also be released sequentially, with appropriate programming of the AGU. By retracting the motor control lines, either simultaneously or sequentially, the brake line loads are thus transferred to the AGU motor for the duration of the flight.

It is therefore an object of the present invention to provide a deployment brake release system in which the AGU motor is not subjected to opening force loads, thus enabling motors of lower cost and lighter weight to be used.

Another object of the present invention is to provide a deployment brake release system for use with UAVs that supports simultaneous or sequential release of multiple brake lines.

A further object of the present invention is to provide a relatively simple deployment brake release system for use with UAVs that employs hook mounts on the AGU frame that are fully reusable.

A still further object of the present invention is to provide a deployment brake release system for use with UAVs which is both reliable and secure in use and easy to rig, with minimal opportunities for snagging hazard.

Yet another object of the present invention is to provide a deployment brake release system that can be readily adapted to fit and work effectively with a wide range of UAV parachute sizes and styles without requiring adaptation of the existing parachute structure.

It is yet another object of the invention to provide a deployment brake release system for UAVs that is not complex in structure and which will conform to conventional forms of manufacture so as to provide a brake release system that is economically feasible, long-lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

Figure 1:
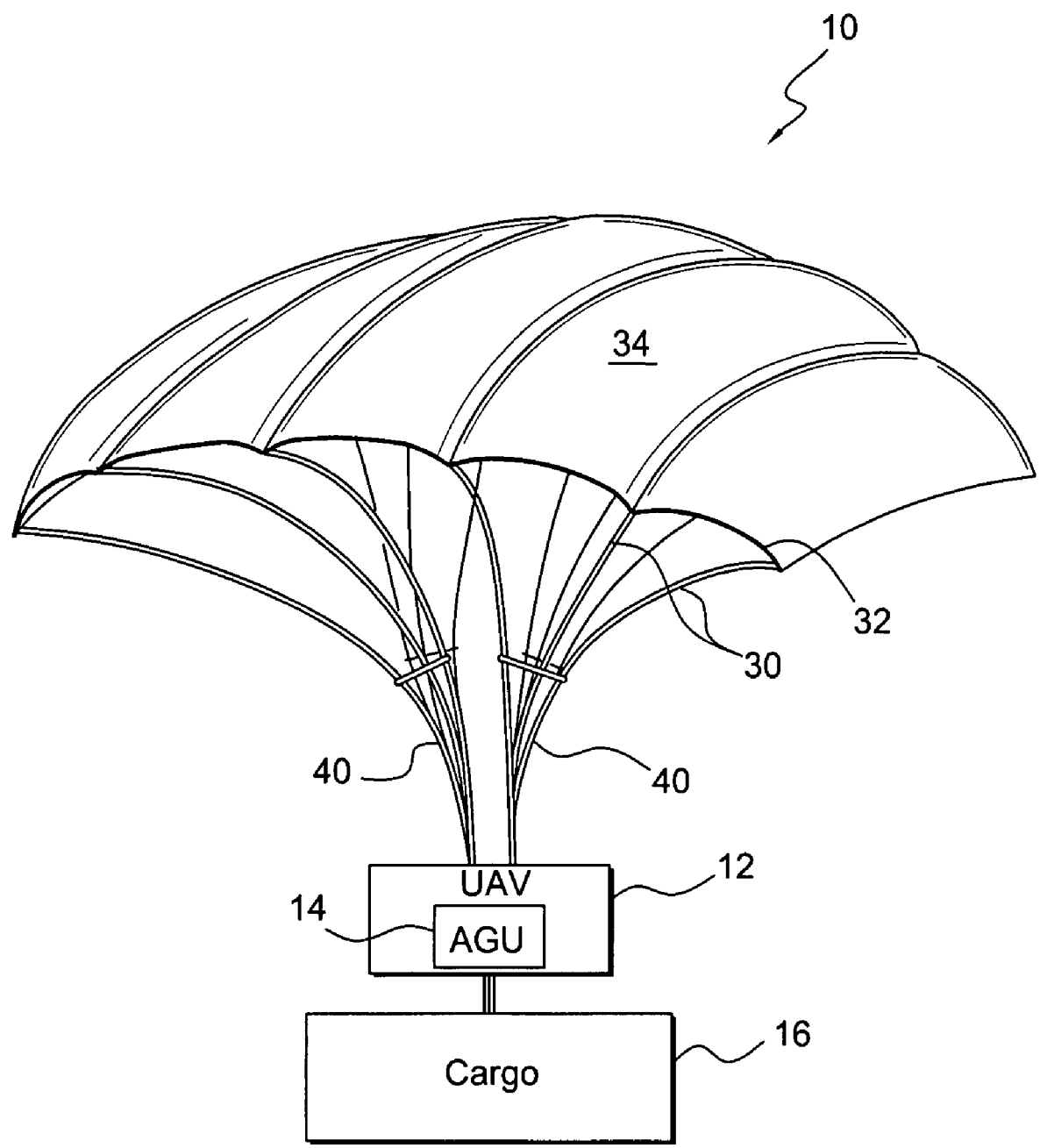
FIG. 1 illustrates a rear view of a ram-air parachute with UAV and AGU in accordance with the prior art.

In describing preferred embodiments of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

As summarized in the diagram of FIG. 1, the deployment brake release system of the present invention is designed for use with a parachute, generally designated by the reference numeral 10, controlled by an unmanned aerial vehicle (UAV) 12 having an airborne guidance unit (AGU) 14 to direct the parachute 10 in flight. Parachutes 10 carrying cargo 16 and guided by UAVs having AGUs are known in the prior art.

Figure 2:
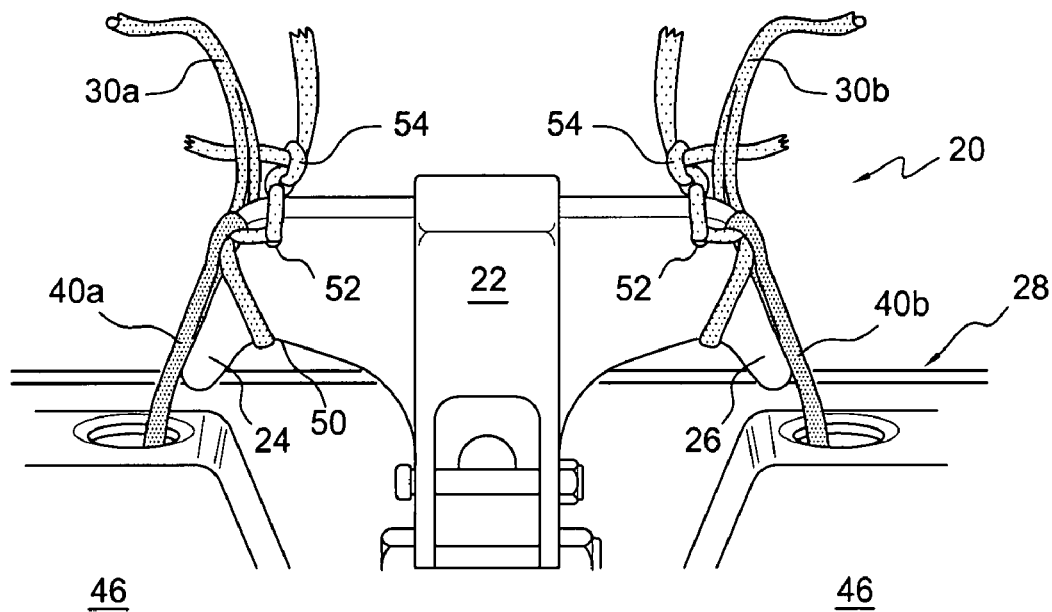
FIG. 2 is a rear perspective view of a deployment brake release system including a hook mount mounted to the rear of a UAV AGU frame and having two hooks with left and right brake lines secured thereto in accordance with the present invention.
Figure 3:
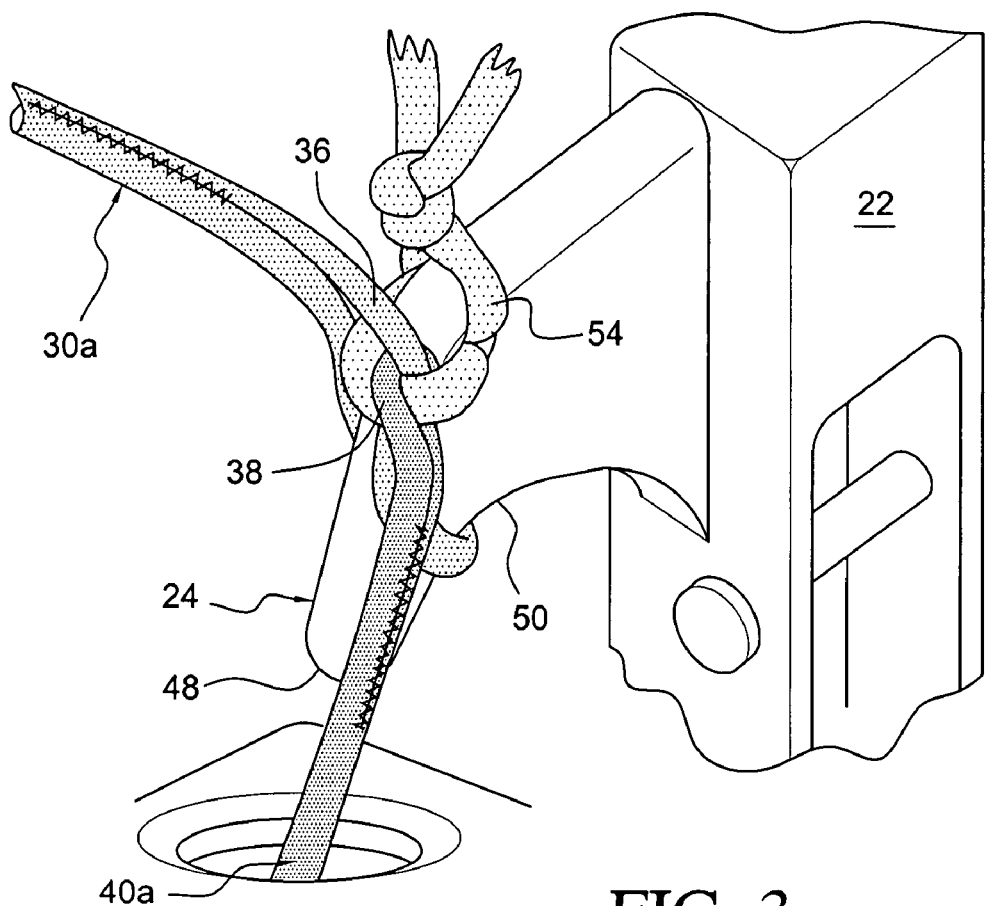
FIG. 3 is an enlarged perspective view of the left side hook with secured brake line shown in FIG. 2.

A first embodiment of the present invention is shown in FIGS. 2 and 3. A deployment brake release system, generally designated by the reference numeral 20, is mounted on the rear of AGU 14 of a parachute system 10 such as that shown in FIG. 1. Shown in FIGS. 2 and 3 in a rigged, pre-deployment configuration, the deployment brake release system 20 includes a hook mount 22 having first and second hooks 22, 24 respectively mounted on the left and right sides of the frame 28 of the AGU. While the preferred embodiment includes left and right hooks, it is possible to construct the deployment brake release system with only a single hook.

As is known, deployment brake release lines 30 are attached to the trailing edge 32 of a parachute canopy 34 during rigging to effect downward deflection of the edge 32 during initial inflation. The deployment brake release lines 30 are subsequently released to allow full inflation of the chute at the appropriate time and, in the case of the left and right outer brake release lines, to provide steering for the parachute after deployment brake release.

According to the present invention, the ends of the left and right brake release lines 30a, 30b remote from the canopy have looped portions 36 which are coupled to corresponding looped portions 38 on left and right motor control lines 40a, 40b. Alternatively, the brake release lines and the motor control lines could be formed integrally as a single trailing edge line. As used herein, the term "brake release line" is comparable to and may be used interchangeably with the term "trailing edge line" as would be understood by persons of ordinary skill in the art. In the embodiment shown, each motor control line 40 is wound upon a respective spool 42 so as to be extendible and retractable under the control of a respective motor 44 which rotates the spool 42. There are thus two motors and two spools, with a motor and spool combination on each of the left and right sides of the AGU frame 28 and a trailing edge line associated with each motor/spool assembly. The motors and spools are protected by a housing 46.

With reference to the left hook 24 as shown in FIGS. 2 and 3, the looped end 36 of the brake release line 30a is secured over the downwardly depending nose 48 of the hook and around a neck 50 thereof. To prevent the looped end from sliding off the nose 48 prior to deployment, the hook is provided with an aperture 52 above the neck through which a fastening element 54 is passed. The fastening element 54 is then passed through at least one of the looped ends of the brake and motor control lines and tied, securing both the motor control line 40 and the brake release line 30 to the hook 24 adjacent the aperture 52. The fastening element acts as a security tie and is made of break cord or other comparable material that can be readily broken by the downward pull of the motor on the motor control line when the brake line is to be released from the hook.

Upon deployment of the parachute system 10 having the brake release system 20, the initial opening force load from the trailing edge 32 of the canopy 34 is applied against the neck of the hook through the brake release line 30. Once the parachute has stopped decelerating and steady state flight has been achieved, the motor 44 is activated by the AGU 14 to pull on the motor control line 40 and, through the looped connection of looped ends 36, 38, on the brake release line 30. This downward pull breaks the fastening element 54 and disengages the brake release line from the hook. As a result, brake line loads are transferred from the hook to the AGU motor 44 for the duration of the flight.

At this point, the motor control line and the brake line act as a single line, with the motor being able to directly deflect the trailing edge of the canopy through retraction of the motor control/brake release line for parachute steering purposes during the flight. Hence, as used herein, a motor control and brake line acting as a single line is referred to as "a steering brake line". As shown in FIG. 2, in this embodiment there are two steering brake lines, one to control each side of the canopy. In larger canopies, there may be more than two steering brake lines, in which case additional motors and spools would also be required to provide independent control of each of the steering brake lines. Alternatively, the canopy may be equipped with an auxiliary "steering" line that is used only for additional flaring power during landing maneuvers.

By directing the canopy opening forces to the frame of the AGU through the hook mount 22, with the motors only having to withstand the steady state load, benefits in weight and cost can be achieved in that the brake line loads during steady state flight are approximately 15% of the peak opening load. As a result, the present invention allows lower capacity and less expensive motors to be used in a field where cost and weight are significant drivers in product design.

Figure 4:
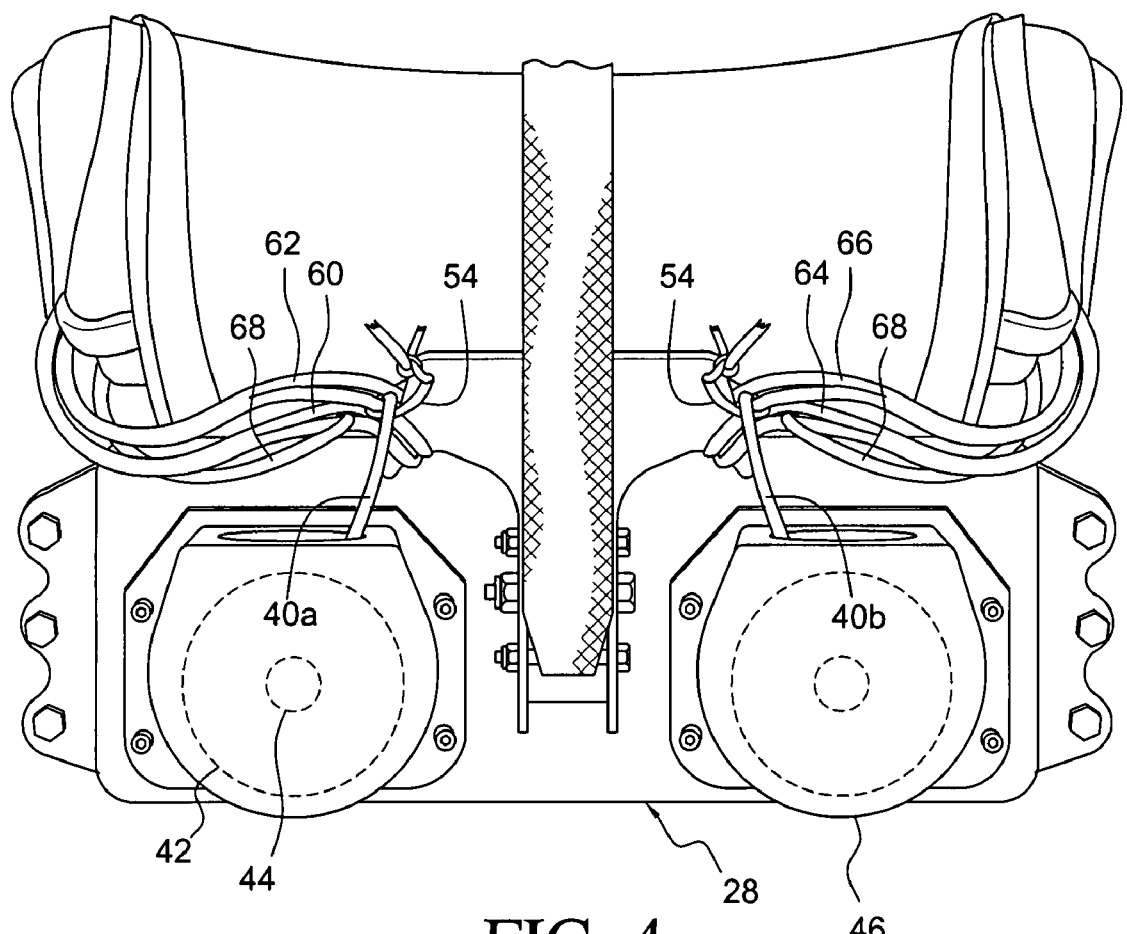
FIG. 4 depicts a deployment brake release system with two hooks and multiple left and right brake lines secured thereto in accordance with the present invention.

A second embodiment of the present invention especially useful for larger cargo parachute systems is shown in FIG. 4. Larger cargo parachute systems need additional brake lines to accommodate the greater total force on the canopy trailing edge and to maintain a better trim shape of the canopy control surfaces during deployment. In most cases, these additional brake lines are used to deflect the canopy only during deployment; they are not used to steer the parachute once steady state flight status has been achieved. Thus, while the release of a greater number of brake lines is required, generally only the last brake line released on each side, i.e., the outer brake lines, will ultimately act as steering brake lines to be controlled by the motors.

In the embodiment shown in FIG. 4, there is only one additional brake line on each side. (The third line shown is a so-called "lazy line" to be described later.) Hence, there are left inner and outer brake lines 60 and 62, respectively, and right inner and outer brake lines 64 and 66, respectively. The left and right outer brake lines 62, 66 are the steering brake lines and they are coupled to the left and right motor control lines 40a, 40b, respectively. The left and right motor control lines are, of course, wound upon the left and right spools as controlled by the left and right motors, respectively.

If both the inner and outer brake lines are to be released simultaneously, then the outer brake lines are looped over the hooks first so as to be highest on the neck, as shown. The looped ends 36 of the inner brake lines are then stacked under the looped ends 38 of the outer brake lines and both the inner and outer brake lines are secured on the hook in this stacked configuration by a fastening element 54. Upon deployment, the inner and outer brake lines deflect the trailing edge of the canopy as has already been discussed. Once a steady state flight condition has been reached, the left and right motors are activated by the AGU to pull down their respective motor control lines. The downward pull on the outer brake lines 62, 66 breaks the fastening elements and, because of the stacked arrangement of the inner brake lines 60, 64, the downward travel of the outer brake lines forces the inner brake lines off the hook as well.

Release of the outer brake lines 62, 66 from the hooks transfers the canopy load to the motor control lines 40 since the outer brake lines and the motor control lines are connected to one another. The inner brake lines 60, 64, by contrast, are connected by their looped ends only to the hooks. Thus, once the inner brake lines are pulled off the hooks, they are free to flap about and possibly interfere with parachute operation, unless restrained in some way. Therefore, the third line, termed a "lazy line" 68 because it does not "work" to deflect the canopy as do the deployment brake release lines, is provided. A lazy line 68 is connected to each non-steering inner brake line and to the frame of the AGU. These lazy lines 68 act to restrain flapping of the non-steering inner brake lines upon their release from the hooks.

In addition to the simultaneous release of multiple brake lines as just described, the present invention also provides for the sequential release of multiple brake release lines. This is advantageous in that the motors are then only required to be strong enough to withstand the forces incurred by the release of one brake line at a time, rather than the combined loads of all of the brake release lines at once.

Figure 5:
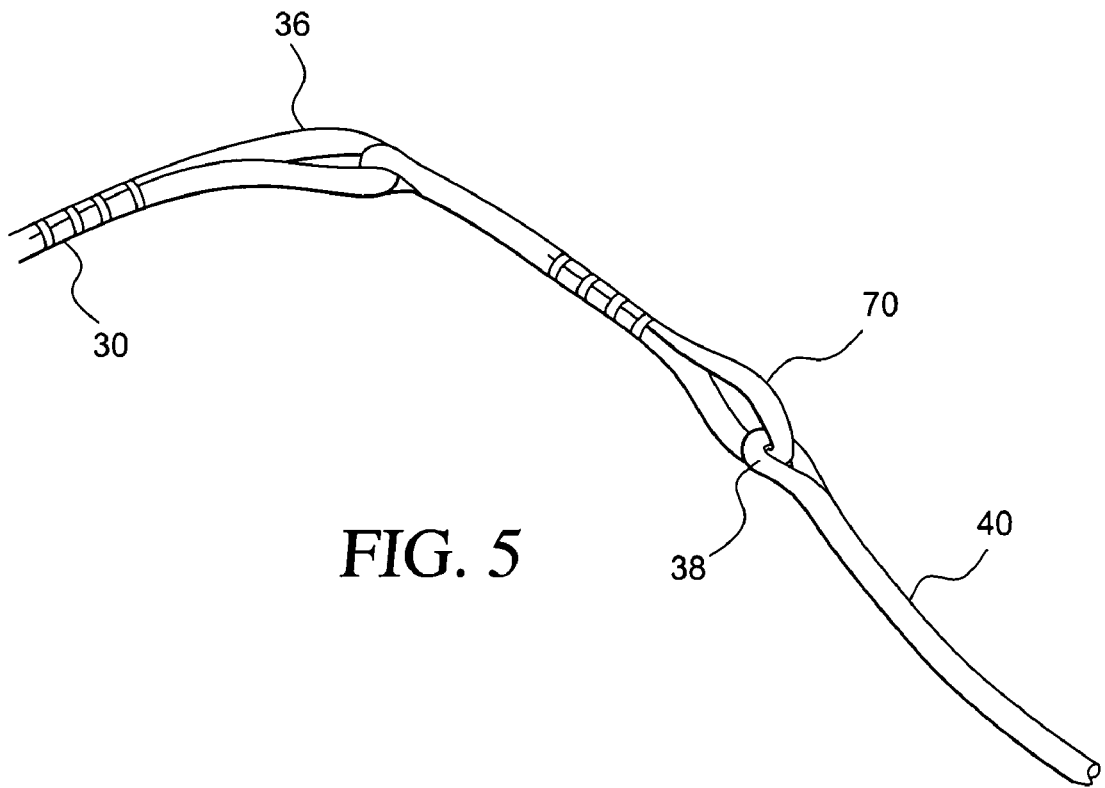
FIG. 5 shows a motor control line with an additional release loop for effecting sequential release of two brake lines as in FIG. 4.

To effect sequential release of multiple brake lines in the embodiment shown in FIG. 4, each of the motor control lines is provided with an additional release loop 70, as shown in FIG. 5. This additional release loop 70, unlike the looped end 38, is positioned intermediately along the length of the line.

As in the simultaneous release configuration, when rigging multiple brake lines for sequential release, the outer brake release line 62 that is connected to the motor control line and which will act as the steering brake line in flight is looped onto the hook first. This is followed by the additional release loop 70 on the motor control line 40 and then by the looped end 36 of the inner brake release line 60. The result is a stacked configuration consisting of the looped end of the outer brake release line 62 at the top, the looped end of the inner brake release line 60 at the bottom, and the additional release loop 70 on the motor control line 40 in between the inner and outer brake lines.

Figure 6A:
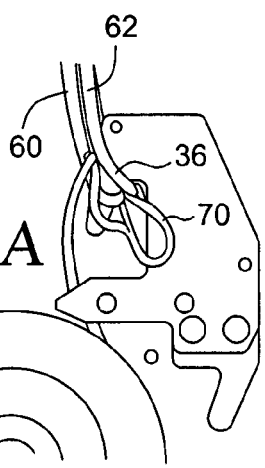
FIGS. 6A through 6H illustrate the sequence by which multiple brake lines are released from the hook of a hook mount in accordance with the present invention.
Figure 6B:
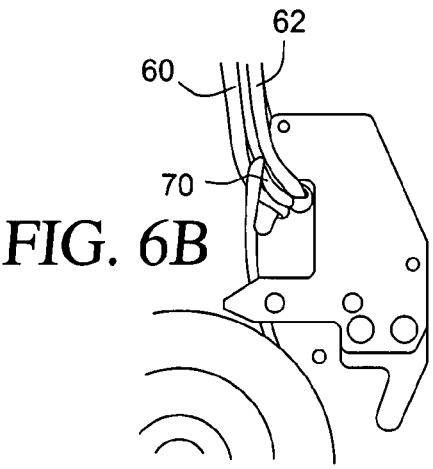
Figure 6C:
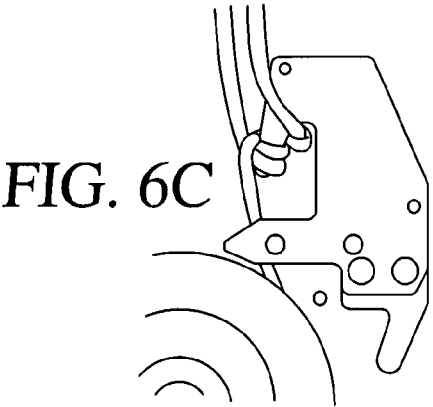
Figure 6D:
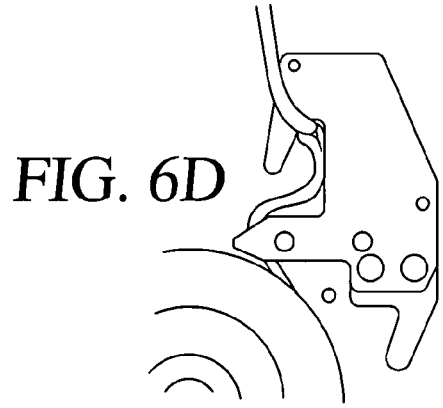

Upon deployment and activation of the motor, as illustrated in FIGS. 6A-6H, the force exerted by the motor is first applied to the additional release loop 70 which, when pulled down, forces the inner brake release line 60 positioned under it down toward the nose of the hook as well (see FIGS. 6A-6C).

FIG. 6C shows the inner brake line 60 just prior to release. For purposes of illustration, a lazy line is not attached to the inner brake line. As a result, upon its release, the inner brake line moves rapidly upward so as to no longer be visible in FIG. 6D. Meanwhile, the outer brake line 62 remains secured to the hook.

Figure 6E:
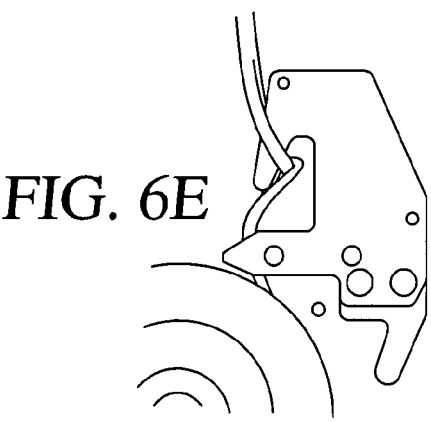
Figure 6F:
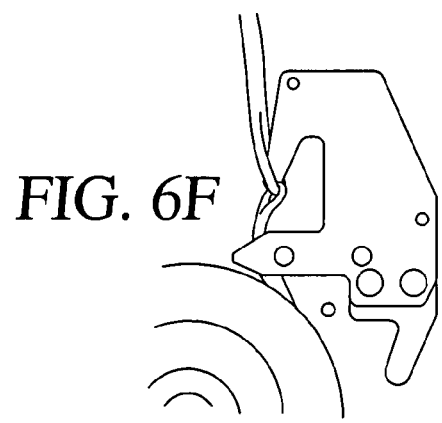
Figure 6G:
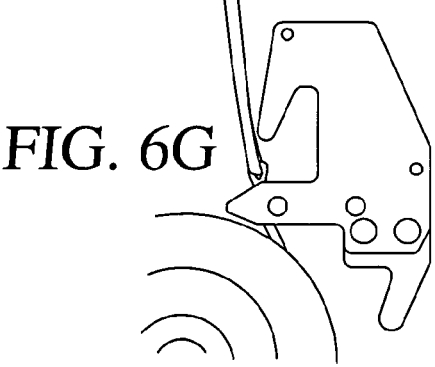
Figure 6H:
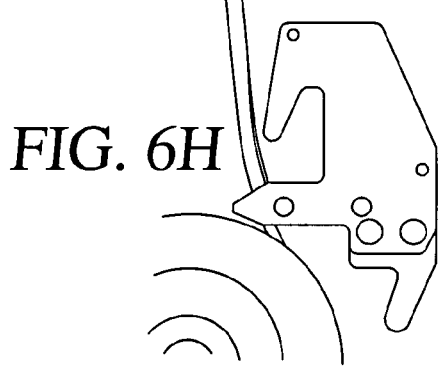

As the motor continues to draw the motor control line inward onto the spool, winding force on the motor control line is next applied to the outer brake line 62, as shown in FIGS. 6E and 6F, pulling the same downwardly. Once the outer brake line is freed from the hook, FIGS. 6G and 6H, the motor acts directly on the resulting steering brake line.

Figure 7:
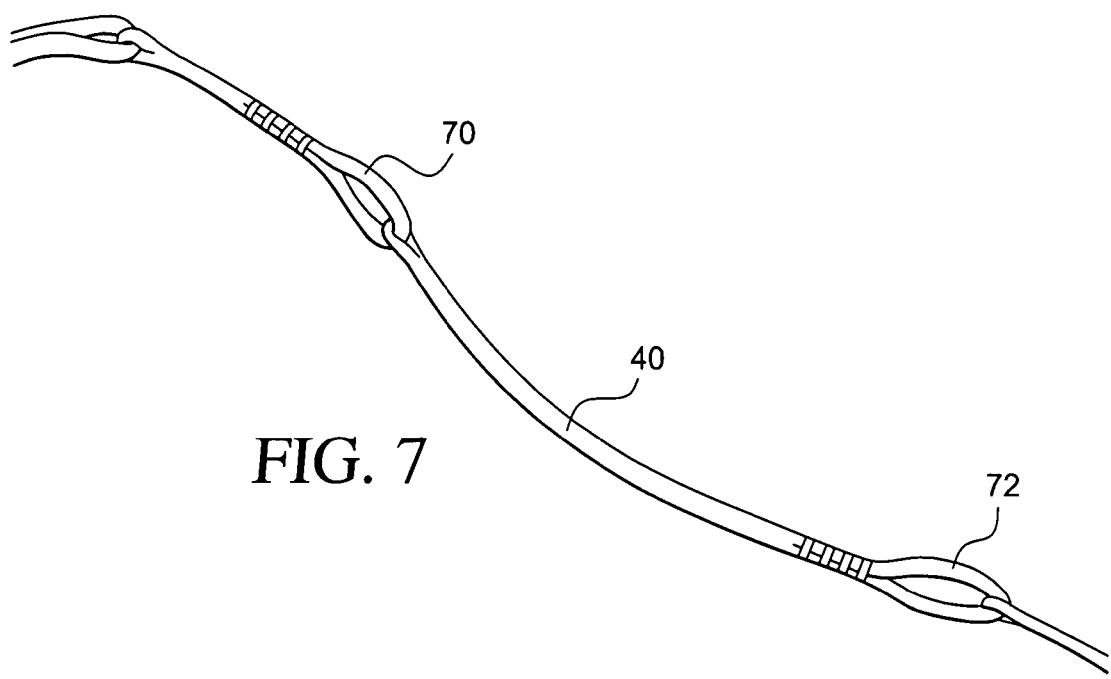
FIG. 7 shows a motor control line with two additional release loops for effecting sequential release of three brake lines in accordance with the present invention.

Additional brake lines may be secured to the hook for sequential release by adding a further release loop 72 to the motor control line 40, as shown in FIG. 7. As evident from the description just provided, the number of additional release loops needed is dependent upon the number of additional inner brake lines to be released in series. Following placement of the outer brake line onto the hook as the first step in rigging, release loops and additional inner brake release lines are stacked one upon the other in an alternating pattern beneath the outer brake line so that, when the motor is activated, one brake release line is freed from the hook with the downward movement of each release loop, in sequence.

As canopy size increases with cargo weight, more brake release lines may be needed than can reasonably be accommodated by one hook without undue congestion. Accordingly, the hook mount 78 may be formed to have more than one hook for the brake release lines on each side of the parachute, as representatively shown in FIGS. 8, 9 and 10. In this embodiment, an upper hook 80 supports one, two or more brake release lines, while a lower hook 82 supports an additional one or more brake release lines. Two motors with respective spools, one on the left side and one on the right, are still sufficient.

Figure 8:
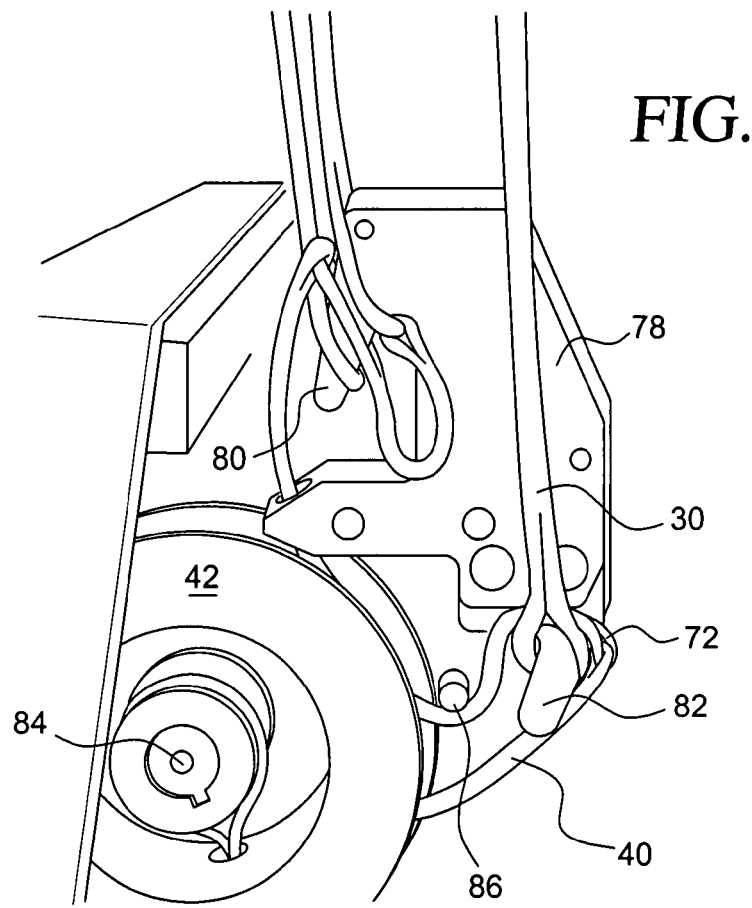
FIG. 8 shows a deployment brake release system having a hook mount with multiple hooks and rigged with multiple brake release lines.

FIG. 8 shows the hook mount 78 adjacent the spool 42 without the housing. As can be seen in the absence of the housing, the motor control line 40 is secured to the axle 84 of the spool 42. The spool rotates clockwise to wind the line thereon as it is drawn from the hooks. From the axle 84, the motor control line is first looped around the lower hook above the brake release line 30 and then is passed over a deflection roller 86 before being directed upwardly to the upper hook 80.

Figure 9:
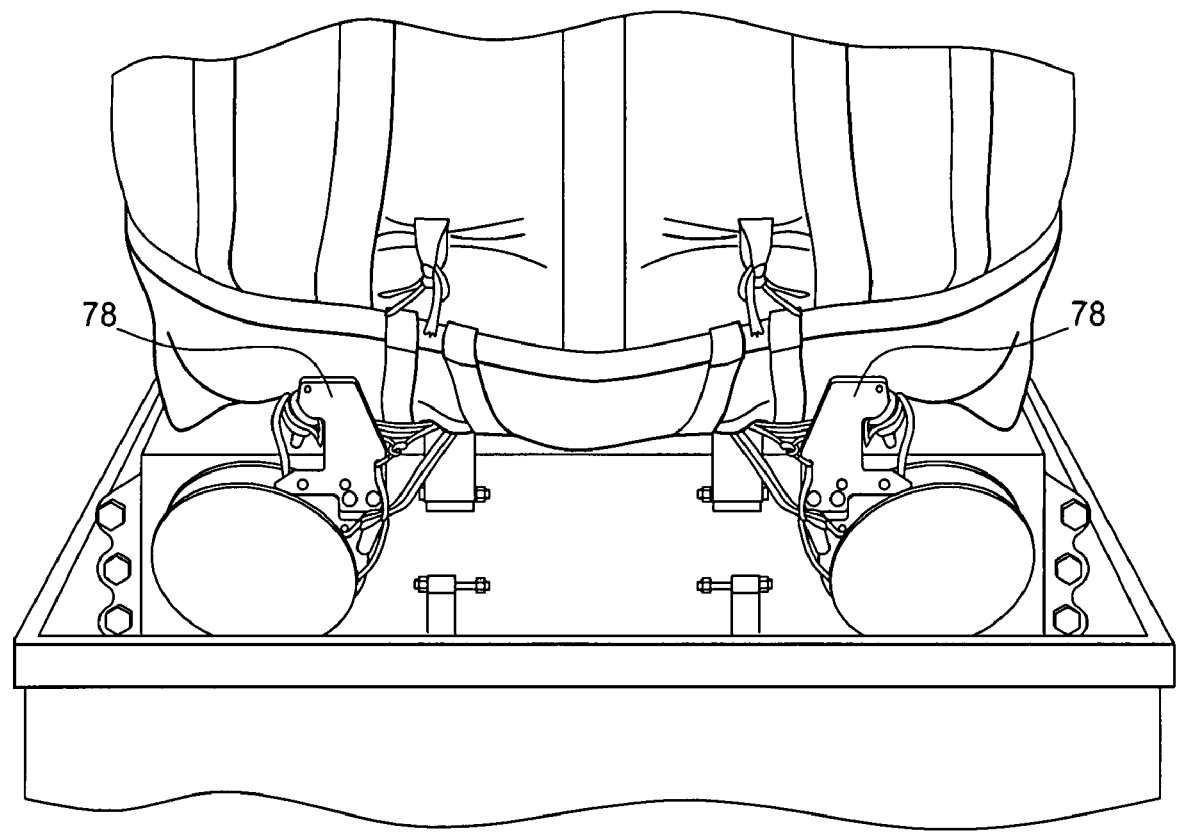
FIG. 9 is a rear perspective view of a deployment brake release system including right and left hook mounts each having two hooks and rigged with multiple brake release lines, along with a rigged parachute on the rear of a UAV AGU frame in accordance with the present invention.
Figure 10:
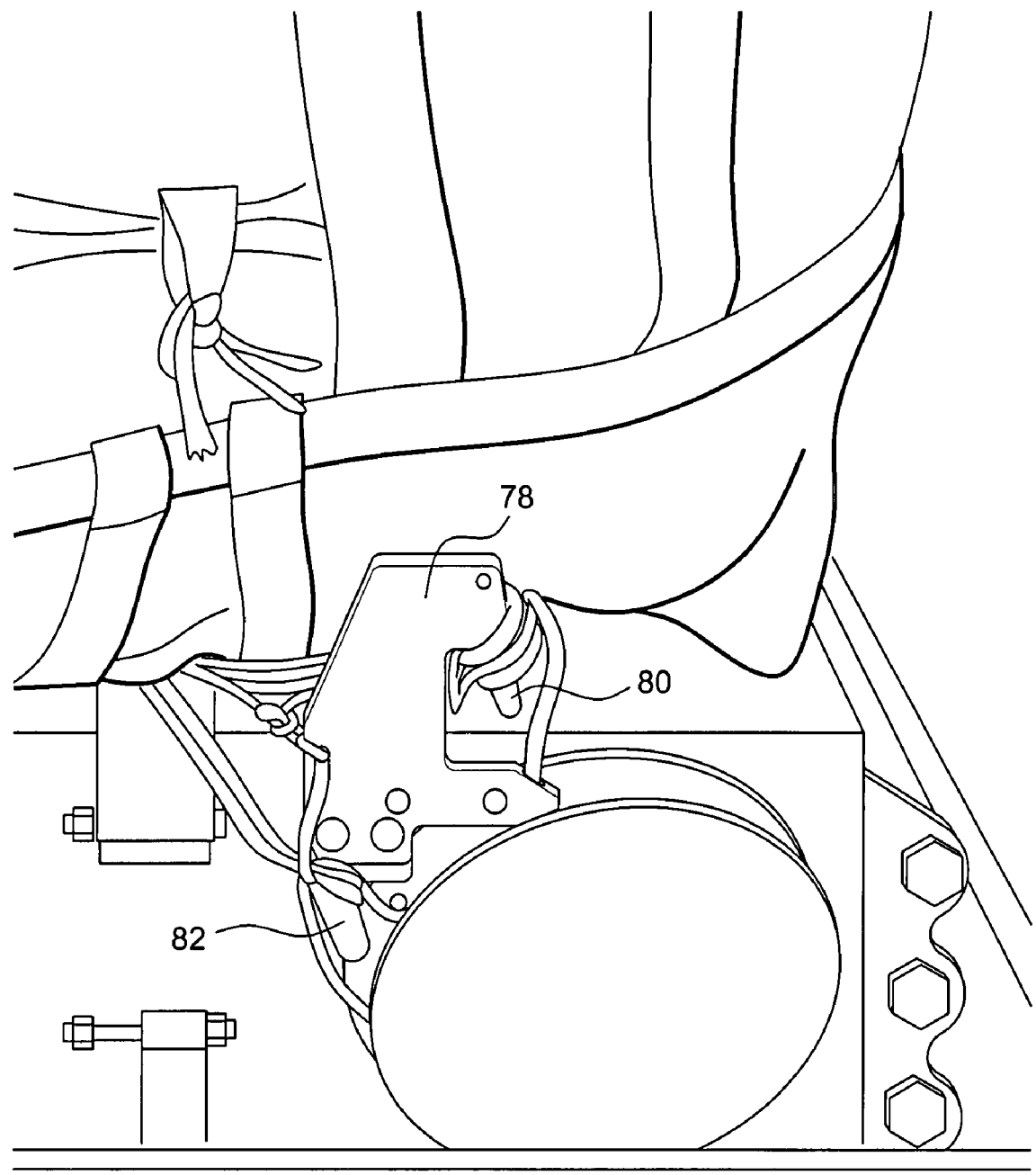
FIG. 10 is a close-up view of the right hook mount with rigged brake release lines of FIG. 9.

FIG. 9 illustrates a fully rigged sequential deployment brake release system with multiple hooks on each hook mount 78 in accordance with the present invention. As shown, multiple brake release lines are secured to each hook, as best seen in FIG. 10 which is an enlarged view of the right hook mount of FIG. 9.

Figure 11A:
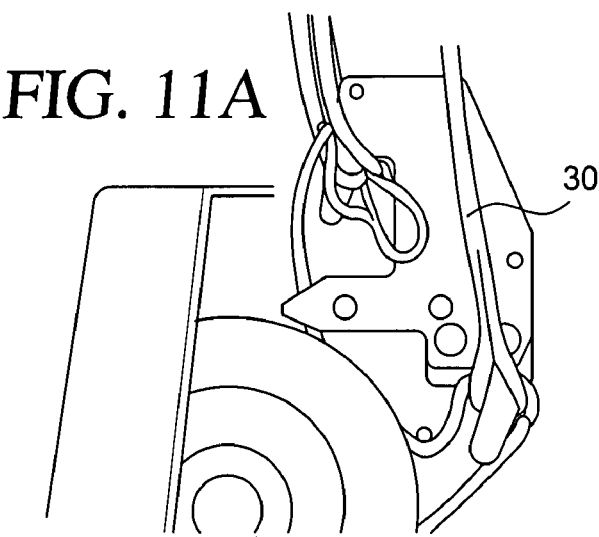
FIGS. 11A through 11P illustrate the sequence by which multiple brake lines are released from the top and bottom hooks of the hook mount having multiple hooks as shown in FIGS. 8-10.
Figure 11B:
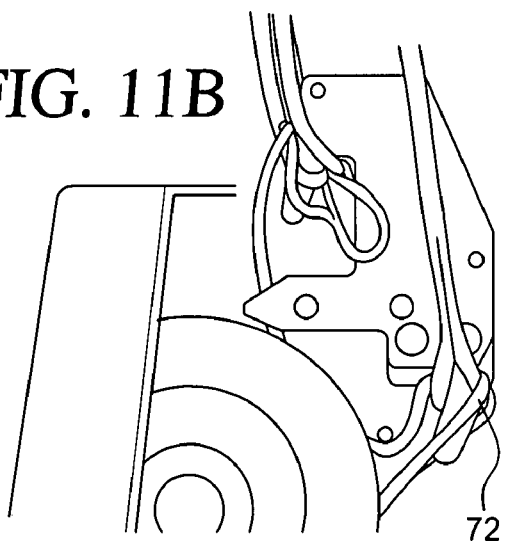
Figure 11C:
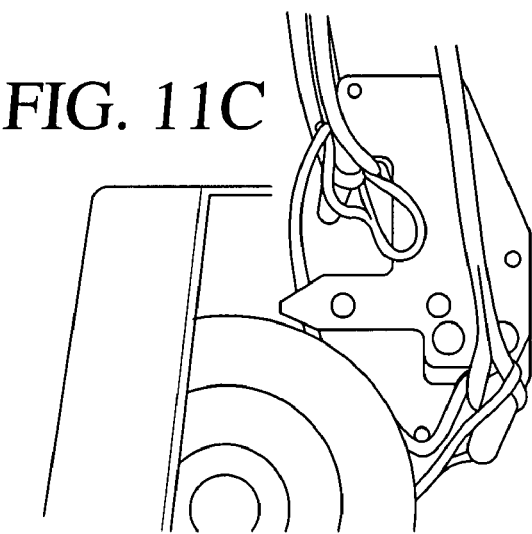
Figure 11D:
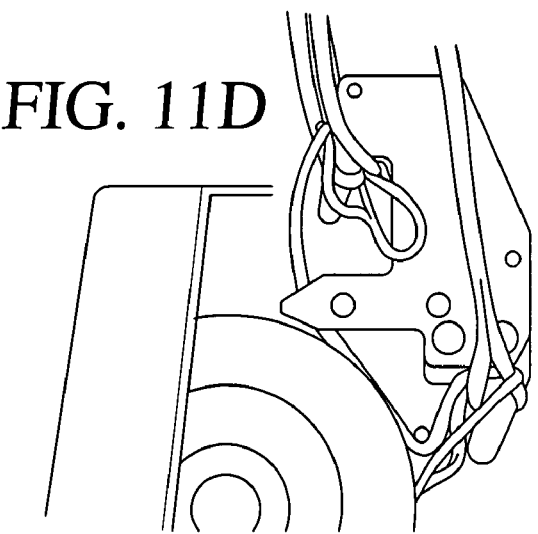
Figure 11E:
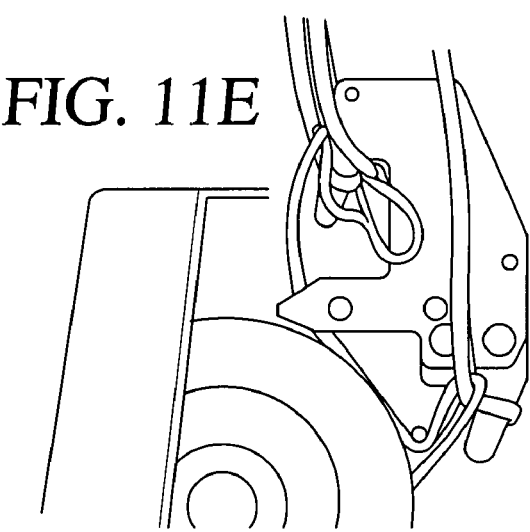
Figure 11F:
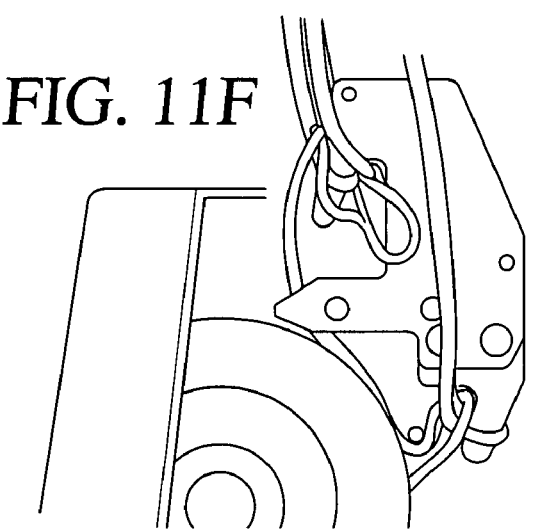
Figure 11G:
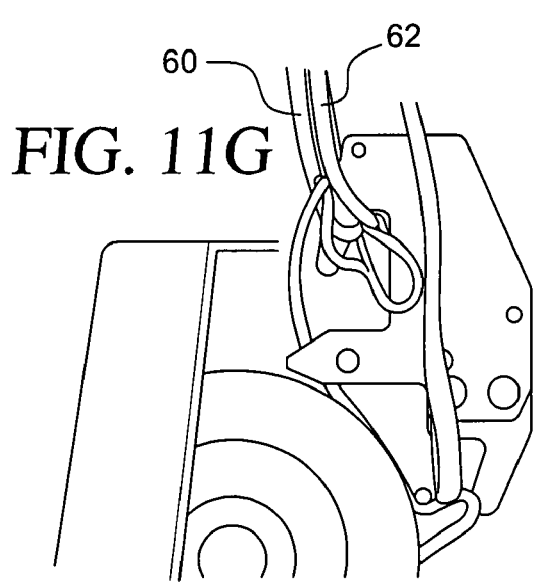
Figure 11H:
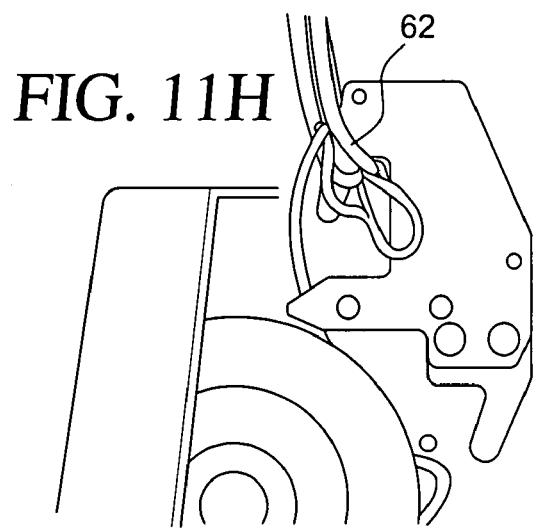
Figure 11I:
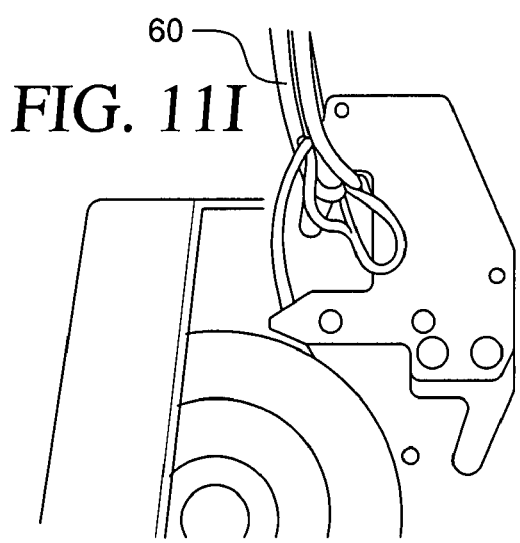
Figure 11J:
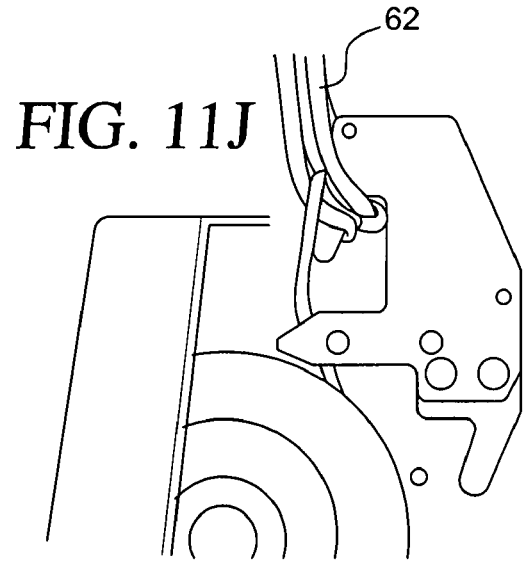
Figure 11K:
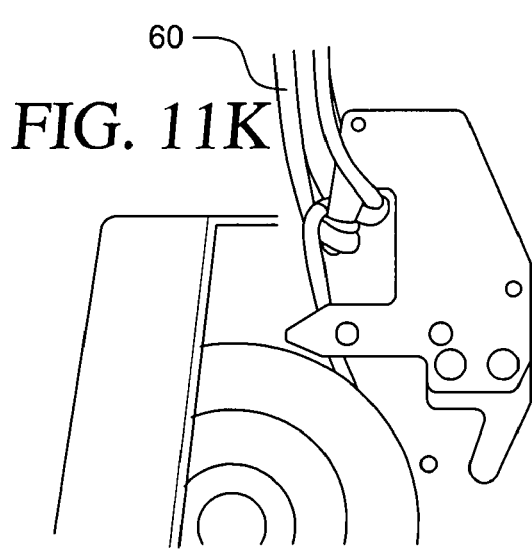
Figure 11L:
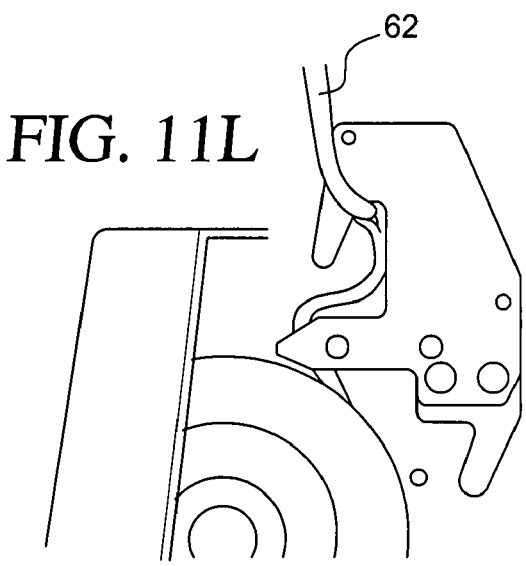
Figure 11M:
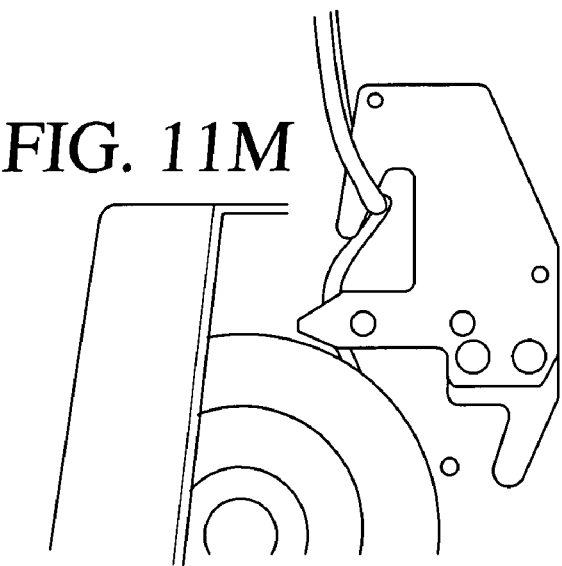
Figure 11N:
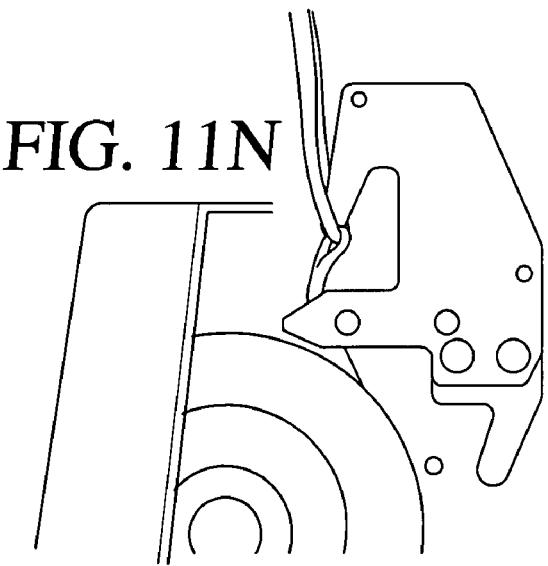
Figure 11O:
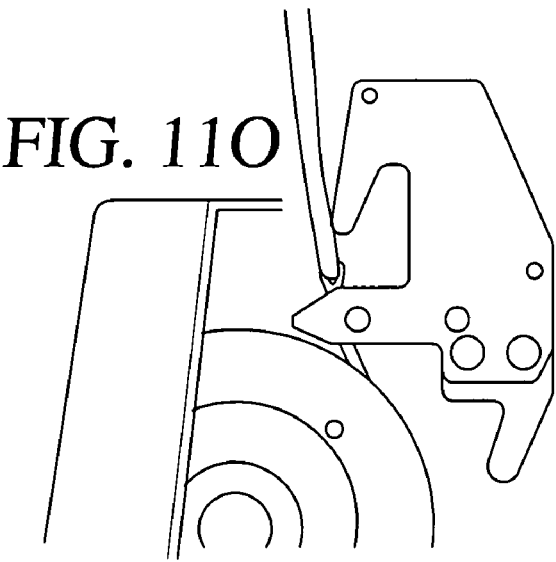
Figure 11P:
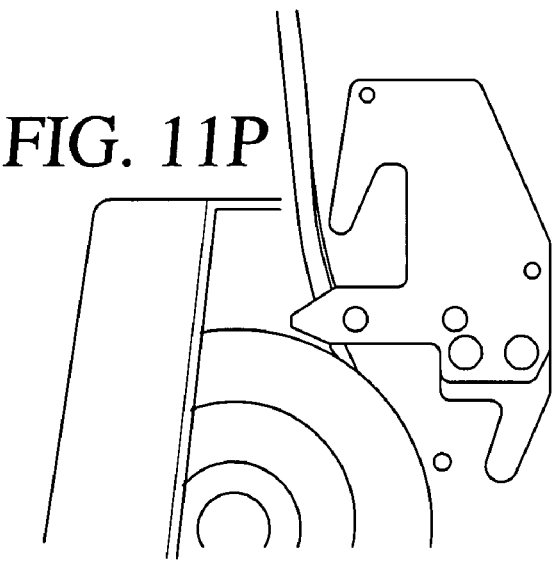

The sequential release of the multiple brake release lines as rigged in FIG. 8 is depicted in FIGS. 11A-11P. As shown in FIGS. 11A to 11G, upon activation of the motor, the rotation of the spool 42 first exerts an inward pull on the first additional motor control line loop 72 positioned on the lower hook 82. This pull draws the first motor control line loop 72 downward toward the nose of the lower hook, pushing the first brake release line 30 that is stacked under the first control line loop 72 downwardly at the same time until both are free (FIG. 11G).

The motor control line 40 is then released from its engagement with the deflection roller 86 (FIG. 11H) and, as the motor continues to rotate the spool to remove the slack in the line, downward pressure is thereafter applied to the second motor control line loop 70 which is lowermost on the upper hook 80. This pressure draws the second motor control line loop 70 downward toward the nose of the upper hook (FIGS. 11J and 11K), pushing the second brake release line that is stacked under the second loop downwardly at the same time until both are free (FIG. 11L). In this example, the second brake release line corresponds with the inner brake release line 60.

Continued movement of the motor control line 40 then exerts a downward pull on the looped end 36 of the last brake release line which is uppermost on the upper hook (FIGS. 11M and 11N). In this embodiment, the last brake release line corresponds with the outer brake line 62. Once the looped end 36 is free, the outer brake release line 62 is directly coupled to the motor control line 40 and is thereafter configured as a steering brake line controlled by the motor and AGU for steering the parachute during the remainder of the flight.

As noted, activation of the motors is initiated by the AGU which can be programmed to commence activation at a predetermined velocity. The AGU can also be controlled by a radio frequency signal from a ground-based signal, or by any other means as would be known by persons of ordinary skill in the art.

Figure 12:
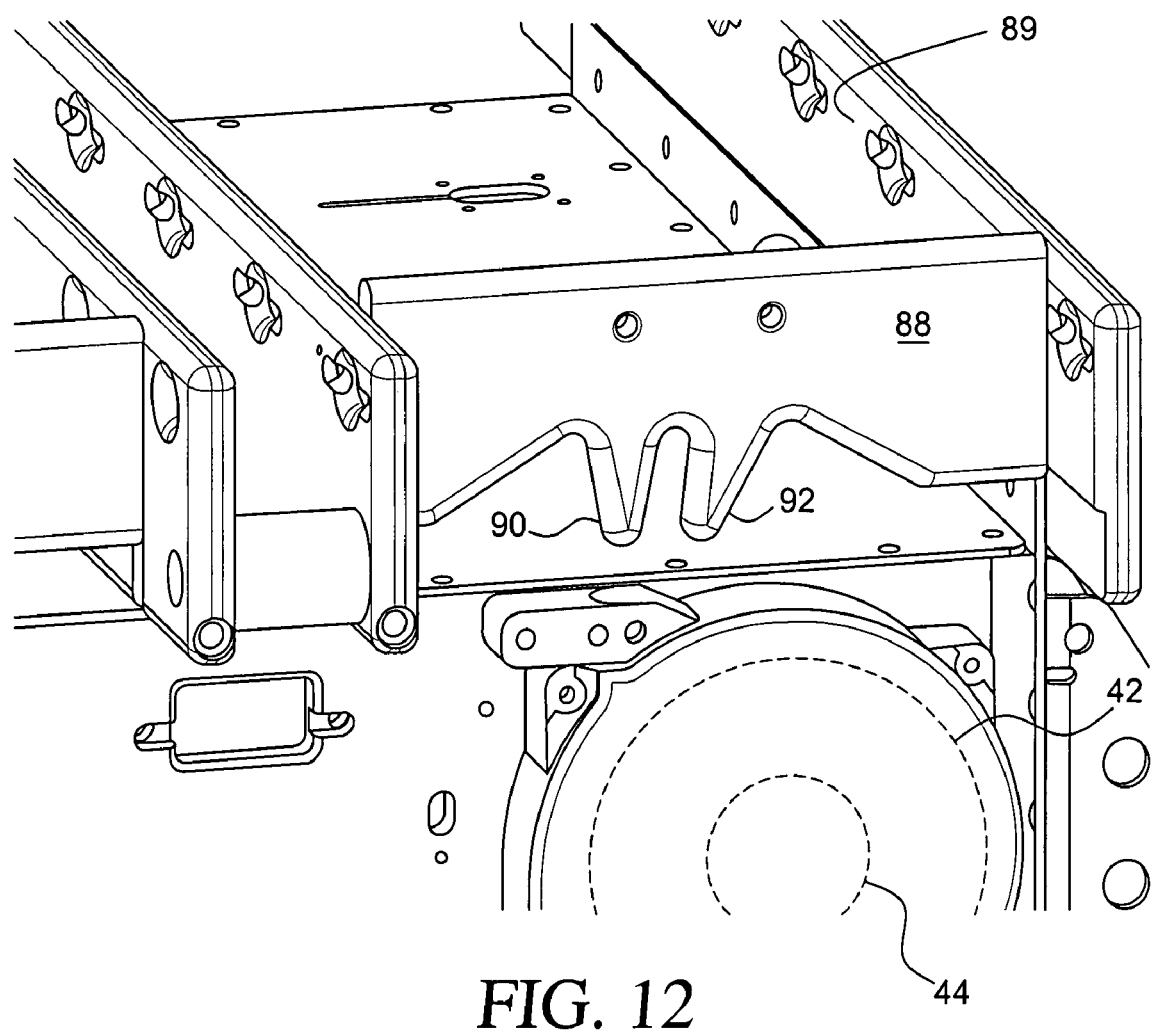
FIG. 12 is an illustration of an alternative design for a hook mount having two hooks in accordance with the present invention.
Figure 13:
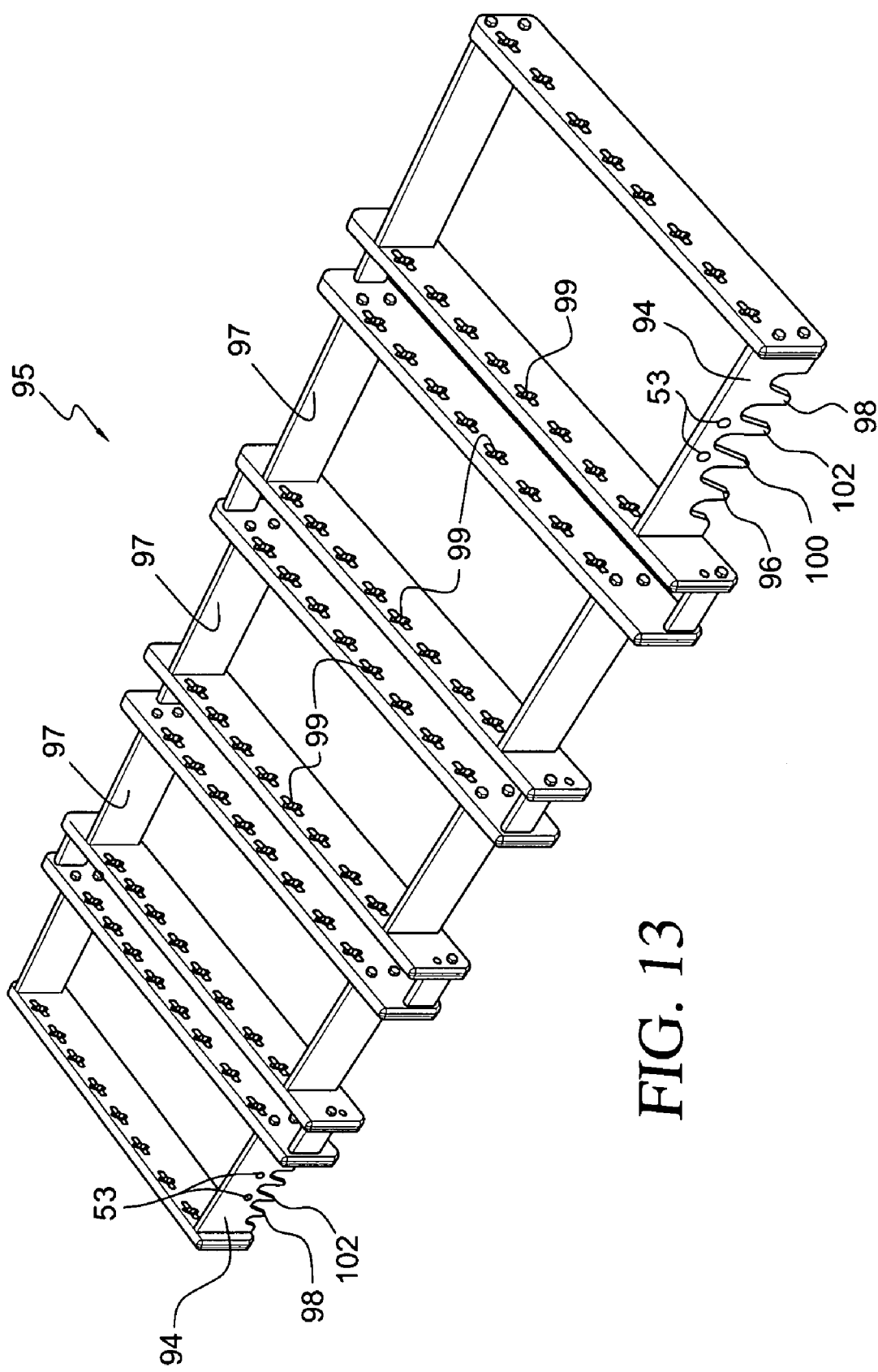
FIG. 13 is an illustration of another alternative design for a hook mount having multiple hooks in accordance with the present invention.

Two further embodiments of hook mounts having multiple hooks are shown in FIGS. 12 and 13. The hook mount 88 in FIG. 12 is mounted on a frame 89 and has an inner hook 90 and an outer hook 92, making it effectively comparable in line management capability to the hook mount embodiment shown in FIGS. 8-11P.

In the hook mount embodiment shown in FIG. 13, however, the hook mount 94 on each side of the frame 95 is provided with four hooks including an inner hook 96, an outer hook 98, an intermediate inner hook 100 and an intermediate outer hook 102. This hook mount 94 can handle a significant number of lines in a compact and highly organized arrangement that can support parachutes of larger size. In fact, successful testing of a brake release in accordance with the present invention has been conducted using rigged hook mounts 94 with a ram-air parachute capable of carrying 30,000 pounds and having a wing-span comparable to that of a Boeing 747 aircraft.

Each of the embodiments shown in FIGS. 12 and 13 operates similarly to the hook mount shown in FIGS. 8-11P, the difference being that the hooks in the FIG. 12 and FIG. 13 embodiments are constructed to be at substantially the same level as compared with the staggered levels of the upper and lower hooks 80, 82, respectively, in the hook mount of FIGS. 8-11P. Also the frame 95 of the hook mounts in FIG. 13 has a modular construction, including a plurality of generally rectangular support members 97 with apertures 99 formed therein through which the suspension lines are run. This modular construction allows the frame size to be easily adapted for parachutes of different sizes.

These differences notwithstanding, suspension lines are rigged on the hooks of hook mount 88 in the same manner as on hook mount 78 of FIG. 8, with fastening elements 54 being run through apertures 53 to secure the rigged lines upon the hooks.

In the release sequence of the left side hook mount 78 shown in FIGS. 11A through 11P, the lines are released from the lower or inner hook 82 and then from the upper or outer hook 80. Similarly, in the FIG. 12 embodiment, which shows the right side of the frame 89, the lines are released first from the inner hook 90 and then from the outer hook 92. With respect to each side of the frame, the same overall sequence pattern of releasing from inside to outside is followed in the hook mount embodiment shown in FIG. 13, with the rigged lines being released from the inner hook 96 first, followed by the inner intermediate hook 100, the outer intermediate hook 102 and finally the outer hook 98. The steering line, which is the outermost brake line on the parachute, is the last line to be released from its rigged position on the outer hook 98 and is thereafter directly controlled by the AGU motor to steer the parachute as in the previously described embodiments.

Other hook mount configurations could also be constructed without departing from the scope of the present invention. The embodiments shown herein were designed to have an overall shape, angle and hook location that demonstrate ease of release, minimum interference with the spool and motor control line during navigation mode, minimum opportunity for snagging hazard, and security of the loops to the hook from aircraft exit to main canopy inflation.

While each of the embodiments described herein has referred to systems with two control motors, a combination of any number of motors and any number of hooks is clearly within the scope of the invention. In fact, the scalability of these designs in both loadings and number of release elements, as well as the ability to provide sequential release, are some of the advantages of the present invention. Other advantages include the reusability and simplicity of the hooks which reduces complexity and cost.

The foregoing descriptions and drawings should be considered as illustrative only of the principles of the invention. The invention may be configured in a variety of shapes and sizes and is not limited by the dimensions of the preferred embodiment. Numerous applications of the present invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

What is claimed is:

1. In combination with a parachute controlled by an unmanned aerial vehicle having an airborne guidance unit (AGU), a deployment brake release system comprising:

an AGU frame to which the parachute is coupled by a plurality of suspension lines that include at least one trailing edge line used to steer said parachute during steady flight state;

a motor and spool assembly controlled by the AGU, said at least one trailing edge line being windable on said spool by said motor;

a hook mount coupled to said AGU frame and associated with said motor and spool assembly, said hook mount including at least one hook having a neck around which the at least one trailing edge line is secured during parachute deployment so that opening canopy forces exerted on said at least one trailing edge line are taken by the hook mount and the AGU frame, said neck tapering to a downwardly directed nose that points in a direction substantially opposite the parachute when deployed;

said AGU being configured to activate said motor when said parachute has reached said steady flight state to wind said at least one trailing edge line onto said spool, said winding pulling said at least one trailing edge line downwardly away from said neck, toward and then off said nose so that, once said at least one trailing edge line is released from the hook, said motor and spool assembly bear steady flight state canopy forces exerted on said at least one trailing edge line and said at least one trailing edge line is controlled by said motor and spool assembly to steer said parachute during flight.

2. The combination as set forth in claim 1, further comprising a fastening element securing said at least one trailing edge line to said neck during rigging, said fastening element being configured to break in response to activation of said motor and resulting downward movement of said at least one trailing edge line off said nose after deployment.

3. The combination as set forth in claim 1, further comprising a second trailing edge line rigged so as to be secured to said hook upon deployment and releasable therefrom simultaneously with said at least one trailing edge line.

4. The combination as set forth in claim 1, further comprising a second trailing edge line rigged so as to be secured to said hook upon deployment and releasable therefrom sequentially with and prior to release of said at least one trailing edge line.

5. The combination as set forth in claim 4, wherein said at least one trailing edge line is secured to said spool by a motor control line that includes a looped portion positioned along a length thereof, said looped portion being secured during rigging to said hook in between said at least one trailing edge line and said second trailing edge line such that removal of said looped portion from said hook also removes said second trailing edge line from said hook.

6. The combination as set forth in claim 5, further comprising a securing line connected to said second trailing edge line and to said AGU frame for restraining free movement of said second trailing edge line upon release thereof from said hook.

7. The combination as set forth in claim 5, wherein said motor control line includes a plurality of additional looped portions positioned in spaced relationship along a length thereof, said additional looped portions being secured during rigging to said hook in alternating fashion with a plurality of additional trailing edge lines such that removal of each additional looped portion from said hook also removes one of said additional trailing edge lines from said hook.

8. The combination as set forth in claim 7, further comprising a securing line connected to said additional trailing edge lines and to said AGU frame for restraining free movement of said additional trailing edge lines upon release thereof from said hook.

9. The combination as set forth in claim 1, wherein said hook mount includes a plurality of hooks each configured to secure trailing edge lines.

10. The combination as set forth in claim 1, wherein said deployment brake release system includes a left hook mount and a right hook mount each having a hook, a left outer trailing edge line being secured to the hook of said left hook mount and a right outer trailing edge line being secured to the hook of said right hook mount prior to and during deployment, said left and right outer trailing edge lines acting as left and right steering lines upon release of said left and right outer trailing edge lines from said hooks.

11. A method for the release of a trailing edge of a parachute, deployed with the trailing edge deflected by a plurality of trailing edge suspension lines, after full inflation of the parachute in a UAV system having an AGU which comprises:

securing at least one trailing edge suspension line to an actuator system mounted to a frame of said AGU;

rigging a looped portion of said at least one trailing edge suspension line onto a downwardly directed projection of a projection mount connected to said AGU frame so as to direct canopy opening loads to said AGU frame during deployment; and activating said actuator system when said UAV system reaches steady state flight to pull said at least one trailing edge suspension line loop downwardly in a direction substantially opposite said parachute to pull said loop off of said projection and transfer canopy loading to said actuator system such that said at least one trailing edge suspension line can be used to steer said parachute in flight using said actuator system.

12. The method as set forth in claim 11, wherein said actuator system includes a spool and a motor, said step of securing including spooling an end of said at least one trailing edge suspension line onto said spool.

13. The method as set forth in claim 11, further comprising, before the step of rigging a looped portion of said at least one trailing edge suspension line, the step of rigging a further looped portion of at least one additional trailing edge suspension line onto said downwardly directed projection;

said step of activating said actuator system then including first pulling said further looped portion of said at least one additional trailing edge suspension line downwardly off of said projection before said at least one trailing edge suspension line is pulled downwardly off of said projection.

14. The method as set forth in claim 11, wherein said downwardly directed projection is a hook having a neck portion and a downwardly depending nose portion extending in a direction substantially opposite said parachute, said step of rigging including passing said looped portion over said nose portion and upwardly toward said parachute onto said neck portion.

15. The method as set forth in claim 14, further comprising the step of securing said looped portion on said neck portion using a fastening element that is configured to break in response to activation of said actuator system.

16. A method for deflecting a trailing edge of a parachute for deployment and of then releasing said trailing edge after full inflation of the parachute during steady state flight in a UAV having an airborne guidance unit (AGU) supported on an AGU frame;

securing a parachute having a canopy to said AGU frame by a plurality of suspension lines that include at least one trailing edge line used to steer said UAV during steady flight state;

coupling said at least one trailing edge line to an actuator system supported on said AGU frame and controlled by the AGU;

securing a portion of said at least one trailing edge line to a neck portion of a hook mount coupled to said AGU frame and associated with said actuator system, said at least one trailing edge line portion being between said actuator system and a connection point of said at least one trailing edge line to said canopy, said hook mount including a nose in fixed relationship to said neck portion, said nose projecting downwardly from said neck portion in a direction substantially opposite the canopy when deployed so that said neck portion is closer to said canopy than is said nose, said at least one trailing edge line remaining secured to said hook mount neck during parachute deployment so that opening canopy forces exerted on said at least one trailing edge line are taken by the hook mount and the AGU frame;

following deployment of said UAV, said AGU activating said actuator system when said UAV has reached said steady flight state;

said actuator assembly pulling said at least one trailing edge line downwardly away from said neck, toward and then off said nose so that said at least one trailing edge line is released from the hook mount;

said actuator system thereafter bearing steady flight state canopy forces exerted on said at least one trailing edge line and controlling said at least one trailing edge line to steer said UAV during flight.

17. The method as set forth in claim 16, wherein said actuator system includes a spool and a motor, said step of coupling including spooling an end of said at least one trailing edge suspension line onto said spool.

18. The method as set forth in claim 16, further comprising, before the step of securing a portion of said at least one trailing edge suspension line, the step of rigging a further looped portion of at least one additional trailing edge suspension line onto said hook mount neck portion;

said step of activating said actuator system then including first pulling said further looped portion of said at least one additional trailing edge suspension line downwardly off of the nose of said hook mount before said at least one trailing edge suspension line is pulled downwardly off of said hook mount.

19. The method as set forth in claim 16, further comprising the step of securing said portion of said at least one trailing edge line on said neck portion using a fastening element that is configured to break in response to activation of said actuator system.

20. An unmanned aerial vehicle (UAV) comprising:
an airborne guidance unit (AGU) supported on an AGU frame;
a parachute secured to said AGU frame and controlled by said AGU during deployment, said parachute having a canopy coupled to said AGU frame by a plurality of suspension lines that include at least one trailing edge line used to steer said UAV during steady flight state;
an actuator system controlled by the AGU, said at least one trailing edge line being coupled to said actuator system;
a hook mount coupled to said AGU frame and associated with said actuator system, said hook mount including at least one hook having a neck and a nose in fixed relationship to one another, said nose projecting downwardly from said neck in a direction substantially opposite the canopy when deployed so that said neck is closer to said canopy than is said nose;
said at least one trailing edge line being secured to said hook neck during parachute deployment so that opening canopy forces exerted on said at least one trailing edge line are taken by the hook mount and the AGU frame;
said AGU being configured to activate said actuator system when said parachute has reached said steady flight state to pull said at least one trailing edge line downwardly away from said neck and in a direction opposite to said canopy, toward and then off said nose so that, once said at least one trailing edge line is released from the hook, said actuator system bears steady flight state canopy forces exerted on said at least one trailing edge line and said at least one trailing edge line is controlled by said actuator system to steer said UAV during flight.

21. The UAV as set forth in claim 20, wherein said actuator system includes a motor and spool assembly, said at least one trailing edge line being coupled to said spool and windable thereon by said motor.

22. The UAV as set forth in claim 21, wherein said at least one trailing edge line is secured to said hook neck by a fastening element that is configured to break in response to retraction of said at least trailing edge line when said motor winds said at least one trailing edge line onto said spool and thereby pulls the at least one trailing edge line downwardly off said hook nose.

23. The UAV as set forth in claim 22, wherein said fastening element includes a breakable cord passed through an aperture in said hook mount.

24. The UAV as set forth in claim 21, further comprising a second trailing edge line rigged so as to be secured to said hook mount during deployment and releasable therefrom sequentially with and prior to release of said at least one trailing edge line.

25. The UAV as set forth in claim 24, wherein said at least one trailing edge line is secured to said spool by a motor control line that includes a looped portion positioned along a length thereof, said looped portion being secured during rigging to said hook mount in between said at least one trailing edge line and said second trailing edge line such that removal of said looped portion from said hook mount also removes said second trailing edge line from said hook mount.

26. The UAV as set forth in claim 20, wherein said AGU frame includes a left hook mount and a right hook mount each having a hook with a generally downwardly directed nose, said at least one trailing edge line being attached to a left side of the canopy and being secured to said left hook mount and a second trailing edge line attached to a right side of the canopy being attached to said right hook mount prior to and during deployment.

* * * * *

UNITED STATES PATENT AND TRADEMARK OFFICE
CERTIFICATE OF CORRECTION

PATENT NO. : 7,648,105 B2
APPLICATION NO. : 11/645029
DATED : January 19, 2010
INVENTOR(S) : Dunker et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 246 days.

Signed and Sealed this

Sixteenth Day of November, 2010

David J. Kappos
*Director of the United States Patent and Trademark Office*